United States Patent
Keilhofer et al.

[11] Patent Number: 6,025,303
[45] Date of Patent: Feb. 15, 2000

[54] SOLIDS COMPOSITION BASED ON CLAY MINERALS AND USE THEREOF

[75] Inventors: Gregor Keilhofer, Tacherting; Johann Plank, Trostberg, both of Germany

[73] Assignee: SKW Trostberg Aktiengesellschaft, Trostberg, Germany

[21] Appl. No.: 09/104,580

[22] Filed: Jun. 25, 1998

[30] Foreign Application Priority Data

Jun. 28, 1997 [DE] Germany ............................ 197 27 541

[51] Int. Cl.⁷ ............................. C09K 7/00; C01B 31/16
[52] U.S. Cl. ........................ 507/140; 507/904; 252/184
[58] Field of Search ................................ 507/140, 901, 507/904; 252/184

[56] References Cited

U.S. PATENT DOCUMENTS

| | | | |
|---|---|---|---|
| 4,014,394 | 3/1977 | Bailey | 507/140 |
| 4,561,985 | 12/1985 | Glass, Jr. | 507/901 |
| 4,944,634 | 7/1990 | Alexander et al. | |
| 5,308,547 | 5/1994 | Burba, III et al. | 507/140 |
| 5,646,092 | 7/1997 | Carminat et al. | 507/901 |
| 5,658,859 | 8/1997 | Burba, III et al. | 507/140 |
| 5,663,122 | 9/1997 | Mueller et al. | 507/140 |
| 5,721,198 | 2/1998 | Burba, III et al. | 507/140 |

FOREIGN PATENT DOCUMENTS

| | | |
|---|---|---|
| 0207810 | 1/1987 | European Pat. Off. . |
| 2285074 | 6/1995 | United Kingdom . |
| 9205123 | 4/1992 | WIPO . |

OTHER PUBLICATIONS

Frederic Lavoix et al., "Mixed Metal Hydroxide Drilling Fluid Minimizes Well Bore Washouts," *Oil and Gas Journal*, 90:87–90, Sep. 28, 1992.

*Primary Examiner*—Philip Tucker
*Attorney, Agent, or Firm*—Fulbright & Jaworski, LLP

[57] ABSTRACT

A solids composition based on clay minerals and consisting of a) 40–99.8 wt. % of a clay mineral with a reduced moisture content of $\leq 7$ wt. %, b) 0.01–30 wt. % of a mixed metal hydroxide and c) 0.01–30 wt. % of a solid base, and if necessary other additives, is described. The solids composition of the invention is an easy-to-use thickening agent for water-based drilling fluids, and has a long-term stability of at least three months.

19 Claims, No Drawings

SOLIDS COMPOSITION BASED ON CLAY MINERALS AND USE THEREOF

BACKGROUND AND SUMMARY OF THE INVENTION

The subject of the invention is a solids composition based on clay minerals and use thereof for the preparation of a water-based drilling fluid.

The sinking of drill holes needed for the development and exploitation of fossil fuels, water or geothermal energy, and also for tunnelling under roads and river or stream courses, requires the use of drilling fluids.

This drilling fluid serves many purposes; in addition to stabilizing the drill hole, it serves to cool and lubricate the drill bit, to carry the drill cuttings when it is circulating and to suspend the drill cuttings when it is not circulating. This means that when circulating, the drilling fluid must be pumpable, being characterized by low viscosity and turbulent flow properties, and when not circulating it must be characterized by immediate gelatinous thickening so as to prevent the drill cuttings from sinking to the bottom of the drill hole again. This type of flow behaviour is referred to as shear-thinning, since the viscosity, as proportionality factor between shear stress and shear gradient, decreases with increasing shear gradient.

According to Bingham, the rheology of a drilling fluid can be described by the yield point, YP (lbs/100 ft$^2$) and the plastic viscosity (PV [cP]). The yield point describes the minimum shear stress required to induce a solid to flow. The further rise in shear stress as the shear gradient increases is termed plastic viscosity. These parameters can be determined by measuring the shear stress in a rotary viscometer with Couette geometry (eg, FANN 35) at different speeds of rotation. The plastic viscosity (PV) is thus obtained as the difference between the shear stresses at 600 and 300 rpm, and the yield point (YP) as the difference between the PV and the shear stress at 300 rpm. The yield point is proportional to the discharging capacity of a drilling fluid. A high plastic viscosity leads to slow drilling progress.

Drilling fluids may be water- or oil-based. In the case of water-based fluids, a clay mineral is usually added to impart viscosity. The disadvantage of such clay-water drilling fluids is that the clay concentration necessary to ensure that the drilling fluid has a sufficiently high carrying capacity results in a very high plastic viscosity. This in turn leads to slow drilling progress and is therefore undesirable.

From the U.S. Pat. Nos. 4,664,843, 5,232,627, 5,532,212 and 5,576,271 additives based on mixed metal hydroxide derivatives are known, which lessen or overcome the aforementioned disadvantages of aqueous drilling fluids. However, the disadvantage of drilling fluids treated with mixed metal hydroxides is that they necessitate a very complicated and tedious mixing procedure, which must be adhered to precisely. First of all, a 2–3 wt. % bentonite suspension has to be prepared. Prior to the addition of other additives, the bentonite must swell for six hours. Then 0.2–0.3 wt. % of mixed metal hydroxide is added, and the suspension sheared, eg, by means of vigorous stirring. The pH must subsequently be adjusted to 10.5 with soda or NaOH, and the mixture then stirred again for another 60 minutes. Finally, mixed metal hydroxide must be added again in order to adjust the flow behaviour, and the pH readjusted. The necessary equipment to do all this is not always available at the drilling site, which severely limits the use of the drilling fluid. There have already been a number of attempts to simplify this procedure, for example by combining the components bentonite, mixed metal hydroxide and base in a dry mixture. The advantage of such a formulation would be that the mixture need only be added to the water, and pH adjustment would be superfluous. The user would have a drilling fluid of high carrying capacity, which would be ready for immediate use.

All previous endeavours in this direction, however, have failed, because after just a few days these formulations no longer show any viscosity-imparting effect. The object of this invention was thus to develop a solids composition based on clay minerals which does not have the aforementioned disadvantages of the prior art and with which it is possible to prepare a water-based drilling fluid of high carrying capacity, even after the dry mixture has been stored for several months.

This object is established by means of a solids composition consisting of a) 40–99.8 wt. % of a clay mineral with a reduced moisture content of $\leq 7$ wt. %; b) 0.01–30 wt. % of a mixed metal hydroxide derivative, and c) 0.01–30 wt. % of a solid base, and if necessary other additives. Surprisingly, it was found that the solids composition of the invention constitutes a thickening agent for water-based drilling fluids, which is easy to use and has a long-term stability of at least three months.

DETAILED DESCRIPTION

The solids composition of the invention consists of at least three components. The main component, which makes up 40–99.8 wt. %, is a clay mineral which preferably consists of bentonite, sepiolite, attapulgite or of synthetic clays such as hectorite, and of combinations thereof. Special preference is given to bentonite, if possible in powder form.

It is essential to the invention that the residual moisture of the clay minerals used to prepare the thickening formulation is reduced from the initial level of some 10 wt. % to less than 7 wt. %, preferably to less than 5 wt. % and even more preferably to 2% or less. This can be done, eg, by drying the clay mineral, eg, at a temperature of 110° C. The length of time the lay mineral is kept at an elevated temperature determines the level of residual moisture. Higher or lower temperatures can also be used for drying, or else drying can be effected by other methods altogether, which are known to persons versed in the art.

The second component which is essential to the invention, component b), consists of 0.01–30 wt. % of a mixed metal hydroxide derivative, as is described, eg, in the U.S. Pat. Nos. 4,664,843, 5,232,627, 5,532,212 or 5,576,271. In this invention, mixed metal hydroxide derivatives are understood to include both mixed metal hydroxides in solid form and also such educts or precursors which react with bases in the water-based drilling fluid to form mixed metal hydroxides. According to a preferred embodiment, use is made of mixed metal hydroxides based on magnesium and aluminium. Examples here are $MgAl(OH)_{4.7}Cl_{0.3}$ and activated hydrotalcite.

The third component essential to the invention, component c, consists of 0.01 to 30 wt. % of at least one solid base. For reasons of cost, preference is given to inorganic bases. Special preference is given to bases from the group $Na_2CO_3$, $CaO$, $Ca(OH)_2$, $NaAlO_2$, $Al(OH)_3$, and/or $Ba(OH)_2$. However, use can also be made of other solid, basic compounds from the group alkali metals, alkaline earth metals and earth metals, especially such compounds as are stable in powder form.

Besides the essential components a), b) and c), the composition of the invention can also contain other substances.

Non-ionic polymers are an example of a useful additive here, which are used as filtrate-reducing agents. Good results have been obtained especially when a polysaccharide is used as filtrate-reducing agent, preferably in a quantity of 0.5–60 wt. % relative to the total weight of components a), b) and c). The polysaccharide may, if necessary, be partially etherified and/or esterified. Preferred polysaccharides are guar gum, cellulose, starch, carob seed flour and cassia. As partially etherified and/or esterified polysaccharides, use is made in particular of derivatives modified with hydroxyethyl and/or hydroxypropyl and/or carboxymethyl groups.

Besides the filtrate-reducing agent, the solids composition of the invention can if necessary contain other additives as well, for example weighting agents, anti-foaming agents, lubricants, corrosion inhibitors, protective colloids and salts. Such additives are known to persons versed in the art and need not be described in more detail here.

The solids composition of the invention is easy to prepare. It is recommended that the components be homogenized according to known methods and introduced into a sealable drum. In this form, the solids composition of the invention remains stable for more than 6 months, and does not lose its viscosity-imparting effect.

The solids composition of the invention is especially suitable for preparing a water-based drilling fluid. To this end, a sufficient quantity of the prepared solids composition is mixed with the water to give a solids content of 1 to 25 wt. % relative to the total weight of the drilling fluid.

The particular advantages of the solids composition of the invention are that the composition can be added to the water without the need for swelling or pH monitoring, and a ready-to-use, water-based drilling fluid of high carrying capacity is obtained in a single step.

The following examples explain the invention in more detail.

DETAILED DESCRIPTION OF THE PREFERRED EMBODIMENTS

EXAMPLES

The properties of the drilling fluids prepared in the following examples are determined as prescribed by the American Petroleum Institute (API) in Directive RP13B-1.

The rheology of the drilling fluids is measured at 600, 300, 200, 100, 6 and 3 rpm with the FANN viscometer described in the API directive. PV and YP are calculated according to API RP13B-1 and the gel strength measured according to API RP13B-1.

Example 1

The example compares the process of successive addition of the individual components bentonite, mixed metal hydroxide and base, and the time needed for this, with the addition of the identical components, combined, however, to a formulation as provided for in the invention.

The amount of each component added is in both cases identical.

Procedure a) Successive addition of individual components:

Introduce 350 g of water into a Hamilton beach mixer cup and stir on setting "low";

Add 10.5 g of Wyoming bentonite and stir for 6 hours;

Add 1.05 g of mixed metal hydroxide according to U.S. Pat. No. 4,664,843, Example 1 (MgAl(OH)$_{4.7}$Cl$_{0.3}$);

Add 0.1 g of NaOH;

Stir for 30 minutes.

b) Simultaneous addition of the components, in the form of a mixture:

Introduce 350 g of water into a Hamilton beach mixer cup and stir on setting "low";

Add a mixture of 10.5 g of Wyoming bentonite, 1.05 g of mixed metal hydroxide according to U.S. Pat. No. 4,664,843 (Example 1) and 0.1 g of NaOH;

Stir for 30 minutes.

Results

| Experiment | FANN-Rheology 600-300-200-100-6-3 | GS 10" | 10' | PV [cP] | YP [lb/100ft$^2$] |
|---|---|---|---|---|---|
| a) | 200-164-149-132-54-44 | 37 | 35 | 36 | 128 |
| b) | 175-141-125-110-48-44 | 41 | 48 | 34 | 107 |

As the example shows, the process of mixing the drilling fluid can be considerably shortened and simplified by combining the components to a formulation and adding them all at once. The following examples illustrate the influence which the moisture content of the clay mineral used in the formulation has on the stability of the viscosity-imparting mixture:

Example 2 a) Composition of the dry mixture:

10.5 g soda-treated Ca-bentonite of varying moisture content 1.05 g mixed metal hydroxide according to U.S. Pat. No. 5,232,627 (Example 5, activated hydrotalcite)

0.22 g solid NaOH

Test procedure:

Introduce 350 g of water into a Hamilton beach mixer cup, and stir on setting "low";

Add 11.77 g of dry mixture;

Stir for 30 minutes;

Measure FANN rheology.

Results

| Storage time [days] | Moisture bentonite [wt. %] | FANN rheology 600-300-200-100-6-3 | GS 10" | 10' | PV [cP] | YP [lb/100 ft$^2$] |
|---|---|---|---|---|---|---|
| 0 | 8 | 44-41-36-29-16-11 | 12 | 17 | 3 | 38 |
| 5 | 8 | 10-7-6-5-4-4 | 7 | 23 | 3 | 4 |
| 0 | <1 | 69-62-49-37-16-11 | 17 | 20 | 7 | 55 |
| 5 | <1 | 65-66-43-33-14-10 | 16 | 19 | 10 | 45 |
| 20 | <1 | 63-55-41-30-13-11 | 16 | 18 | 8 | 47 | b) Composition of the dry mixture:

14 g treated bentonite 1.4 g mixed metal hydroxide according to U.S. Pat. No. 5,232,627 (Example 5)

0.2 g Ca(OH)$_2$

Test procedure:

Introduce 350 g of water into a Hamilton beach mixer cup, and stir on setting "low";

Add 15.60 g of dry mixture;

Stir for 30 minutes;

Measure FANN rheology.

Results

| Storage time [days] | Moisture bentonite [wt. %] | FANN rheology 600-300-200-100-6-3 | GS 10" | 10' | PV [cP] | YP [lb/100 ft²] |
|---|---|---|---|---|---|---|
| 0 | 9 | 151-123-104-80-45-28 | 31 | 34 | 28 | 95 |
| 3 |   | 74-65-60-51-38-22 | 27 | 44 | 9 | 56 |
| 7 |   | 27-26-25-29-20 | 23 | 44 | 1 | 25 |
| 0 | 1 | 180-151-130-96-51-40 | 40 | 47 | 29 | 122 |
| 7 |   | 172-139-122-98-47-40 | 42 | 50 | 33 | 106 |
| 14 |   | 175-142-121-95-43-41 | 40 | 45 | 33 | 109 |
| 21 |   | 169-149-125-101-48-40 | 41 | 48 | 20 | 129 |
| 28 |   | 165-150-135-100-45-39 | 39 | 45 | 15 | 135 |

Example 3

Composition of the dry mixture:

10.5 g bentonite of low Na-montmorillonite content 1.05 g mixed metal hydroxide according to U.S. Pat. No. 5,232,627 (Example 5)

0.65 g $NaAlO_2$

Test procedure:

Introduce 350 g of water into a Hamilton beach mixer cup, and stir on setting "low";

Add 12.2 g of dry mixture;

Stir for 30 minutes;

Measure FANN rheology.

Results

| Storgage time [days] | Moisture bentonite [wt. %] | FANN rheology 600-300-200-100-6-3 | GS 10" | 10' | PV [cP] | YP [lb/100 ft²] |
|---|---|---|---|---|---|---|
| 0 | 10 | 35-27-24-23-12-8 | 10 | 13 | 8 | 19 |
| 2 | 10 | 11-9-8-7-6-6 | 6 | 7 | 2 | 7 |
| 0 | 1 | 34-26-23-19-8-5 | 9 | 12 | 8 | 18 |
| 2 | 1 | 32-25-22-18-7-5 | 7 | 7 | 7 | 18 |
| 7 | 1 | 34-26-23-20-8-7 | 8 | 8 | 8 | 18 |
| 20 | 1 | 33-25-22-20-7-5 | 8 | 8 | 8 | 17 |

Example 4 a) Composition of the dry mixture:

10.5 g bentonite of high Na-montmorillonite content (high-grade Wyoming bentonite)

0.9 g mixed metal hydroxide according to U.S. Pat. No. 5,232,627 (Example 5)

0.22 g solid NaOH

Test procedure:

Introduce 350 g of water into a Hamilton beach mixer cup, and stir on setting "low";

Add 11.66 g of dry mixture;

Stir for 30 minutes;

Measure FANN rheology.

Results

| Storage time [days] | Moisture bentonite [wt. %] | FANN rheology 600-300-200-100-6-3 | GS 10" | 10' | PV [cP] | YP [lb/100 ft²] |
|---|---|---|---|---|---|---|
| 0 | 8 | 190-165-152-131-55-43 | 41 | 45 | 25 | 140 |
| 2 | 8 | 8-6-5-4-4-2 | 3 | 4 | 2 | 4 |
| 0 | 1 | 204-184-169-148-69-53 | 50 | 53 | 26 | 164 |
| 4 | 1 | 198-174-159-138-65-49 | 53 | 52 | 24 | 150 |
| 20 | 1 | 169-153-140-123-72-60 | 49 | 52 | 16 | 137 | b) Composition of the dry mixture:

9 g Wyoming bentonite of high Na-montmorillonite content 0.9 g mixed metal hydroxide according to U.S. Pat. No. 4,664,843 (Example 1)

0.2 g soda

Test procedure:

Introduce 350 g of water into a Hamilton beach mixer cup, and stir on setting "low";

Add 10.1 g of dry mixture;

Stir for 30 minutes;

Measure FANN rheology.

Results

| Storage time [days] | Moisture bentonite [wt. %] | FANN rheology 600-300-200-100-6-3 | GS 10" | 10' | PV [cP] | YP [lb/100 ft²] |
|---|---|---|---|---|---|---|
| 0 | 10 | 82-74-69-62-21-19 | 19 | 19 | 8 | 66 |
| 2 |   | 21-18-17-16-14-12 | 13 | 17 | 3 | 15 |
| 0 | 2 | 76-65-54-46-25-18 | 18 | 21 | 12 | 53 |
| 17 |   | 65-57-52-45-26-22 | 17 | 19 | 8 | 49 |

Example 5

Composition of the dry mixture:

14 g Wyoming bentonite of high Na-montmorillonite content 0.93 g magnesium oxide 0.47 g $NaAlO_2$ Test procedure:

Introduce 350 g of water into a Hamilton beach mixer cup, and stir on setting "low";

Add 15.4 g of dry mixture;

Stir for 30 minutes;

Measure the FANN rheology.

Results

| Storage time [days] | Moisture bentonite [wt. %] | FANN rheology 600-300-200-100-6-3 | GS 10" | 10' | PV [cP] | YP [lb/100 ft²] |
|---|---|---|---|---|---|---|
| 0 | 10 | 93-84-80-73-32-26 | 26 | 30 | 9 | 75 |
| 7 |   | 12-9-8-7-8-8 | 8 | 12 | 3 | 6 |
| 0 | 1 | 81-73-62-53-30-17 | 22 | 25 | 8 | 65 |
| 14 |   | 75-62-57-50-29-20 | 23 | 21 | 13 | 49 |
| 28 |   | 77-63-60-48-29-21 | 22 | 24 | 14 | 49 |

Example 6

Composition of the dry mixture:
14 g modified Ca-bentonite
1.4 g mixed metal hydroxide according to U.S. Pat. No. 5,232,627 (Example 5)
0.2 g Ca(OH)$_2$ Test procedure:
Introduce 350 g of water into a Hamilton beach mixer cup, and stir on setting "low";
Add 15.6 g of dry mixture;
Stir for 30 minutes;
Measure FANN rheology.

Results

| Ageing time [days] | Moisture bentonite [wt. %] | FANN rheology 600-300-200-100-6-3 | GS 10" | 10' | PV [cP] | YP [lb/100 ft$^2$] |
|---|---|---|---|---|---|---|
| 0 | 10 | 43-41-39-38-28-23 | 27 | 46 | 2 | 39 |
| 2 | 10 | 7-5-4-3-3-3 | 2 | 2 | 2 | 3 |
| 0 | 5 | 34-32-32-31-27-24 | 24 | 45 | 2 | 30 |
| 2 | 5 | 31-28-27-27-22-19 | 21 | 38 | 3 | 25 |
| 15 | 5 | 29-27-26-26-23-21 | 24 | 43 | 2 | 25 |
| 30 | 5 | 30-28-26-26-22-20 | 22 | 40 | 2 | 26 |
| 60 | 5 | 28-26-24-23-21-19 | 21 | 36 | 2 | 24 |
| 120 | 5 | 30-27-25-22-21-19 | 20 | 41 | 3 | 24 |

It is claimed:

1. A solids composition based on clay minerals, comprising:
   a) 40–99.8 wt. % of at least one clay mineral with a reduced moisture content of ≦7 wt. %;
   b) 0.01–30 wt. % of a mixed metal hydroxide derivative, and
   c) 0.01–30 wt. % of at least one solid base.

2. The composition of claim 1, wherein said clay mineral has a reduced moisture content of ≦5 wt. %.

3. The composition of claim 1, wherein said clay mineral is selected from the group consisting of bentonite, sepiolite, attapulgite synthetic clays and combinations thereof.

4. The composition of claim 1, wherein said mixed metal hydroxide derivative comprises magnesium and aluminum.

5. The composition of claim 1, wherein said base is selected from the group consisting of Na$_2$CO$_3$, CaO, Ca(OH)$_2$, NaAlO$_2$, Al(OH)$_3$, and Ba(OH)$_2$.

6. The composition of claim 1, further comprising from 0.5–60 wt. % of a filtrate-reducing agent relative to the total weight of components a), b) and c).

7. The composition of claim 6, wherein said filtrate-reducing agent comprises at least one polysaccharide.

8. The composition of claim 7, wherein said polysaccharide is selected from the group consisting of guar gum, cellulose, starch, carob seed flour, and cassia.

9. A method of preparing a water-based drilling fluid, comprising stirring the solids composition of claim 1 with water, wherein the quantity of solids composition is calculated such that the solids content is 1 to 25 wt. % relative to the total weight of the drilling fluid.

10. The composition of claim 7, wherein said polysaccharide is partially etherified with a moiety selected from hydroxyethyl, hydroxypropyl, carboxymethyl and mixtures thereof.

11. The composition of claim 7, wherein said polysaccharide is partially esterified with a moiety selected from hydroxyethyl, hydroxypropyl, carboxymethyl and mixtures thereof.

12. The composition of claim 3, wherein said synthetic clay is hectorite.

13. The composition of claim 2, wherein said clay mineral is selected from the group consisting of bentonite, sepiolite, attapulgite synthetic clays and combinations thereof.

14. The composition of claim 2, wherein said mixed metal hydroxide derivative comprises magnesium and aluminum.

15. The composition of claim 3, wherein said mixed metal hydroxide derivative comprises magnesium and aluminum.

16. The composition of claim 3, wherein said base is selected from the group consisting of Na$_2$CO$_3$, CaO, Ca(OH)$_2$, NaAlO$_2$, Al(OH)$_3$, and Ba(OH)$_2$.

17. The composition of claim 13, wherein said base is selected from the group consisting of Na$_2$CO$_3$, CaO, Ca(OH)$_2$, NaAlO$_2$, Al(OH)$_3$, and Ba(OH)$_2$.

18. The composition of claim 2, further comprising from 0.5–60 wt. % of a filtrate-reducing agent relative to the total weight of components a), b) and c).

19. The composition of claim 3, further comprising from 0.5–60 wt. % of a filtrate-reducing agent relative to the total weight of components a), b) and c).

* * * * *

UNITED STATES PATENT AND TRADEMARK OFFICE
CERTIFICATE OF CORRECTION

PATENT NO. : 6,025,303
DATED : Feb. 15, 2000
INVENTOR(S) : Keilhofer et al.

It is certified that error appears in the above-identified patent and that said Letters Patent is hereby corrected as shown below:

In the <u>cover page</u>, in the section entitled <u>U.S. Patent Documents, line 5</u>, change "Carminat" to -- Carminati --.
In the <u>cover page</u>, in the section entitled <u>Abstract, line 3</u>, change "≤" to -- ≤ --.
In <u>column 2, line 18</u>, change "≤" to -- ≤ --.
In <u>column 5, line 7</u>, change "0   9    151" to -- 0   151 --.
In <u>column 5, line 8</u>, change "3    74" to -- 3   9    74 --.
In <u>column 5, line 10</u>, change "0   1    180" to -- 1   180 --.
In <u>column 5, line 12</u>, change "14   175" to -- 14   1    175 --.
In <u>column 6, line 63</u>, change "0   1    18" to -- 0   18 --.
In <u>column 6, line 64</u>, change "14   75" to -- 14   1    75 --.
In <u>column 7, line 32</u>, change "≤" to -- ≤ --.
In <u>column 7, line 37</u>, change "≤" to -- ≤ --.

Signed and Sealed this

Eighth Day of May, 2001

NICHOLAS P. GODICI

Attest:

Attesting Officer

Acting Director of the United States Patent and Trademark Office